United States Patent [19]

Arnaud

[11] Patent Number: 4,816,329

[45] Date of Patent: Mar. 28, 1989

[54] LAMINATED MATERIAL WITH A BASIS OF THERMOPLASTIC RESINS, PROCESS FOR PRODUCING SUCH A MATERIAL, AND LAMINATED COMPOSITE MATERIALS OBTAINED THEREWITH

[76] Inventor: Guy Arnaud, Magnieu, 01300 Belley, France

[21] Appl. No.: 14,761

[22] PCT Filed: May 20, 1986

[86] PCT No.: PCT/FR86/00171

§ 371 Date: Mar. 17, 1987

§ 102(e) Date: Mar. 17, 1987

[87] PCT Pub. No.: WO86/07103

PCT Pub. Date: Dec. 4, 1986

[30] Foreign Application Priority Data

| May 23, 1985 | [FR] | France | 85 07997 |
| Aug. 21, 1985 | [FR] | France | 85 12694 |
| Jan. 21, 1986 | [FR] | France | 86 00905 |
| Jan. 21, 1986 | [FR] | France | 86 00906 |

[51] Int. Cl.⁴ ............... B32B 3/26; B32B 5/20; B29C 67/22; B29C 39/12
[52] U.S. Cl. .................. 428/280; 264/45.3; 264/46.5; 264/257; 428/282; 428/286; 428/309.9; 428/317.5
[58] Field of Search ............ 264/46.5, 45.3, 257; 428/285, 317.5, 317.9, 282, 286, 309.9

[56] References Cited

U.S. PATENT DOCUMENTS

| 3,394,043 | 7/1968 | Parlin et al. | 161/67 |
| 3,660,555 | 5/1972 | Rains et al. | 264/126 |
| 4,130,614 | 12/1978 | Saidla | 264/46.5 X |

FOREIGN PATENT DOCUMENTS

| 1953037 | 5/1971 | Fed. Rep. of Germany . |
| 1414153 | 9/1965 | France . |
| 2061313 | 6/1971 | France . |
| 2132377 | 11/1972 | France . |
| 1305956 | 2/1973 | United Kingdom . |

*Primary Examiner*—Philip Anderson
*Attorney, Agent, or Firm*—Bacon & Thomas

[57] ABSTRACT

The invention relates to a new material in thermoplastic resin.

The new laminated material with a basis of thermoplastic resin according to the invention is characterized in that it is in the form of a skin with at least one smooth face (1a), and having at least one dense and compact layer of thermoplastic resin, which layer is free from any gaseous trapping, and a fibrous layer (1b) formed of thermoplastic resin fibers and being an integral part of the compact layer.

The invention finds an application in the production of wall coverings and panels.

18 Claims, 3 Drawing Sheets

LAMINATED MATERIAL WITH A BASIS OF THERMOPLASTIC RESINS, PROCESS FOR PRODUCING SUCH A MATERIAL, AND LAMINATED COMPOSITE MATERIALS OBTAINED THEREWITH

TECHNICAL FIELD

The present invention relates to the technical field of materials with a basis of thermoplastic resins, and more particularly materials of the type generally called laminates, usable directly as they are, or as elements in the manufacture of laminated articles.

PRIOR ART

Generally thermoplastic resins are known to be unusable in the production of laminated materials reinforced with very long fibrous elements such as in the case of thermosetting resins.

One way of reinforcing thermoplastic resins, normally molded under a high pressure of between 100 and 600 bars, is for example, to incorporate short glass fibers. The fibers are incorporated to the resin prior to the molding, their length varying between five and ten millimeters and the resulting mixture is presented in granule form. Molding is then performed from said granules by high pressure injection. During the different production phases, the average length of the fibers decreases considerably. It has also been found that, on the inside of the molded article, the longest fibers were all oriented in the flowing direction of the material, which presents certain disadvantages.

Also, the installation necessary for producing such laminates based on thermoplastic resins (injection press and mold) is very expensive, and furthermore it can become rapidly damaged, due to the very abrasive nature of certain fibers. And in all these techniques, the problem arises of evacuating the air when producing a fiber-reinforced laminated structure: defects can occur in the finished article, if such evacuation is not total.

Finally, when producing a part molded in thermoplastic resins reinforced with fibers (glass-fibers for example), the viscosity of the resin is increased, so that only articles of limited surfaces and of relatively large thickness can be obtained. Such articles, although they may react better to mechanical stresses than articles produced from pure resin, nevertheless have a fatigue strength to repeated bending stresses which is limited by the fact that a rise of temperature occurs between the fibers and the resin, or between the fibers themselves.

As a result, and despite all the advantages presented heretofore by thermoplastic resins, their use in the field of laminated articles remains reduced to a minimum compared with the thermosetting resins.

Said raw materials and production process are not really suitable for producing either a base material, or a laminated material with good structural cohesion which gives it suitable mechanical properties and the ability of being coupled in layers or strata form with other materials, in order to obtain laminated articles free from any risks of delamination.

Yet, there is a latent need for such a material usable as is, or as base material in the production of cohering laminated composites, such as walls, partition walls or articles required to have a good coefficient of sound and heat insulation with the added ability to be coupled with other materials.

A solution to this problem could have been that proposed in French Pat. No. A-70-33 052 (2 061 313). Said patent indeed describes a method for producing a material and/or a laminated article containing thermoplastic resins. According to said patent, a material is produced by placing in a mold a layer of thermoplastic fibers, which are pressed and heated up to the melting temperature. The mold may be heated, simultaneously on both its faces in order to obtain a plate or the like with two smooth surfaces, or on only one face, to obtain a plate with one smooth surface and one fibrous surface.

Such a new material is obtained from a closed mold, heated up to the melting temperature of the material, and in which the thermoplastic material undergoes a pressure.

This production method is unsatisfactory for the reasons given below.

The main disadvantage in using a closed mold is that air or other gaseous phases remain trapped in the material, with all the problems attached to this.

First of all, these air or other gaseous trappings confer to the material a heterogeneous character and variable properties of mechanical strength. Also, if such a material is, later on, subjected to heating for a thermo-shaping phase, the gaseous trappings rise in pressure and expand inside the mass of material, thus further increasing the heterogeneous character and the bad mechanical properties.

If a molding is made of the material, there is a risk of internal pockets forming due to the concentration of the trappings which are re-grouped by migration in preferential areas of the mold. The resulting molded part then will present a weak point which is localized and difficult to identify.

The existence of gaseous trappings promotes moisture take-up, which impairs the quality of the material.

The presence of pockets or trappings confers bad properties of fatigue strength under reversed bending stresses and create a risk of delamination of one or more strata of the resulting material.

It has been proposed, in an attempt to overcome these disadvantages, to subject the material inside the mold to a high pressure, the object being, not really to eliminate the trappings, but rather to reduce their volume. It is the object implied, although not actually specified, in the aforesaid French Patent when this recommends to subject the material to a pressure of about 150 kp/cm$^2$.

In actual fact, this method presents a great number of disadvantages.

In the first place, if the volume of gaseous trappings tends to decrease, their internal pressure on the contrary, tends to increase considerably. So that there are, within the material, punctual areas of high pressure which further increase the heterogeneous nature of the material, which material is then, even less adapted to undergo later on, a thermoshaping operation.

In the second place, heating of the fibrous material understandably evolves first with the contact of the mold wall or walls. This results in the creation of a mass, which is first paste-like then fluid, said mass being localized and very sensitive to the applied pressure. The conducted experiments have actually revealed that, in such a case, there is a separate fluid phase delivery moving relatively as a front. In the case of the production of a material containing a layer or network of reinforcing fibers, such a front disorganizes the fibers which are, for part of them at least, pushed back locally by the advancing movement of the fluid front. The said fibers are locally compacted, and very slightly or not enveloped in the fluid material and, for some of them at least, locked, during the cooling, in a stressed condition.

All these effects result in a heterogeneous material, with uncertain mechanical properties being obtained.

It is the object of the present invention to solve the aforesaid problem, by proposing a new material with a basis of thermoplastic resins and a new process for producing such material. The invention further relates to the articles obtained from said new material.

The new material according to the invention can be used as is or in the preparation of laminated composite materials.

One particular object of the invention is to propose a new material which is free from any gaseous trappings and has a structure based on at least one layer or skin of dense and compact material comprising, on one face and closely bonded thereto, a fibrous network formed of fibers of same nature.

Another object of the invention is to permit the production of a new laminated material composed of two dense and compact layers or skins with, between them, a fibrous sheet constituting an insulating layer of pseudo-elastic nature.

Yet another object of the invention is to permit the production of a laminated material containing one or more layers of reinforcing fibers.

SUMMARY OF THE INVENTION

According to the invention, the new material is characterized in that it is in the form of a skin with at least one smooth face, and having at least one dense and compact layer of thermoplastic resin, which layer is free from any gaseous trappings, and a fibrous layer formed of thermoplastic resin fibers and being intergral with the compact layer.

The invention also relates to the process for producing said material, which process consists in :

preparing a felt from thermoplastic resin fibers, laying at least one felt in a mold open at its periphery, heating at least one of the faces of the mold while exerting a slight pressure on the felt.

raising up and adjusting the temperature of the heating face of the mold to the melting temperature of the thermoplastic resin fibers, keeping up said temperature in order to cause the melting of fibers of the felt through part of the thickness of said felt, cooling the mold while keeping up a low pressure, then opening the mold in order to release the new material.

The invention further relates to any new laminated composite materials produced from the new material according to the present invention.

Various other characteristics will emerge from the following description with reference to the accompanying drawings, which show by way of example and non-restrictively, embodiments of the object of the invention.

BEST WAY TO CARRY OUT THE INVENTION

Figure 1:
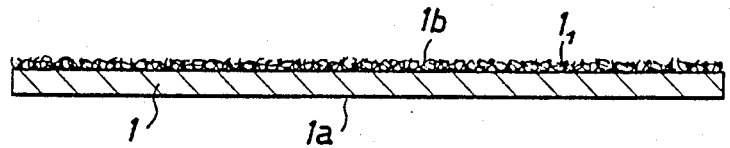
FIG. 1 is a diagram of an elevational cross-section of the new material according to the invention.

Referring first to FIG. 1, this shows the new material according to the invention which is characterized in that, being produced entirely from thermoplastic resins, it comprises a skin of compact resin 1, free of any gaseous trappings, of either constant or variable thickness, and of flat or complex shape. Said skin 1 has a smooth face 1a and a fibrous- or fluffy-type face 1b, formed by a multitude of optionally criss-crossed fibers in thermoplastic resins, said fibers being integral with the material of the skin from which they rise to form a soft layer $1_1$ which may have any thickness with respect to the thickness of the skin 1.

Depending on the raw material used, the skin 1 is either rigid or relatively elastically deformable, and has the physical characteristics of the raw material.

The new material according to the invention is obtained as follows.

Before carrying out the method according to the invention, some felts are produced in known manner from a thermoplastic resin such as for example polyamides, polypropylene, ethylene, polyterephtalate, etc. These felts may be constituted, either of discontinuous fibers, or of continuous yarns, and in this case produced according to the technique known as "spunbonding".

Figure 2:
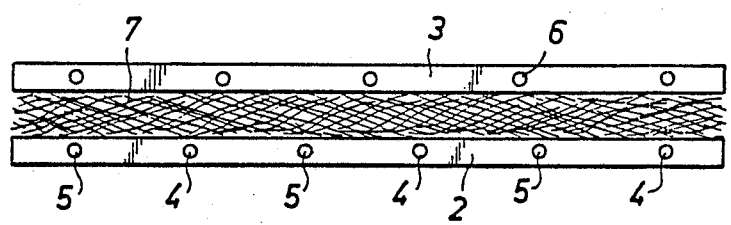
FIG. 2 is an elevational cross-section showing one phase of the production.

Referring now to FIG. 2, the installation used for carrying out the process according to the invention, essentially comprises two superposable plates 2,3. The lower plate 2 may be, alternately, heated and cooled, whereas the upper plate 3 is only cooled. The plates are brought to the required temperature by any appropriate means, such as for example, by means of conduits 4, 5, 6 conveying heat-transferring fluids. For example, lower plate 2 comprises an alternation of conduits 4, 5 used in succession, conduits 4 raising the temperature of the plate, and conduits 5 cooling it down. As to conduits 6 of upper plate 3, these are solely designed to convey the cooling fluids. The two plates 2, 3 will also be operationally coupled to means of moving them apart or closer together, in such a way as to exert a pressure on the material trapped between them.

According to the invention, a felt 7 in thermo-meltable thermoplastic resin is laid on plate 2, said felt being covered over by plate 3 brought so as to exert on the felt a low pressure per surface unit, such as for example between 50 and 300 kgp/m$^2$. Depending on the construction of plate 3, said pressure can be caused just by the weight of the plate, or it can be kept up by a suitable mechanism which is not part of the invention.

Then the low pressure which is exerted does not demand that the plate 3 be heavy. Said plate can then be weighted, or operated by a device permitting control of the exerted pressure. In the direction of the controlled pressure, the plate path will have to be limited by adjustable stops. In some case, when its contacting surface is not too irregular, the cold plate 3 may be replaced by a supple diaphragm. Its cooling will then be achieved by the fluid operating it or by ventilation means when the installation is in rest position between two cycles of production.

The lower plate 2 supports a relatively low load. Therefore its construction may be lighter, which is an advantage from an economical standpoint. One economical solution, from both the standpoints of construction and energy consumption, consists in placing an insulation between the thermally active surface of the plate 2 and the structure giving rigidity. The resulting assembly may then be locally equipped with adjustable clamp means, which occupy only part of the edges of the plates, to hold the felt in position.

Plates 2 and 3 thus form a mold which has the characteristic of comprising an open periphery, the primary function of which will be obvious from the following.

According to the process of the invention, once the mold has been coated with the felt 7, the temperature of plate 2 is raised until the melting point of the thermoplastic material is reached and, simultaneously, plate 3 is cooled down. The fibers in contact with plate 2 are progressively melted and form a layer of material which at first is pastelike then relatively fluid and which moves in the form of a face or front, rising vertically, as the level of the melting temperature rises. Such level reaches a stabilizing or balancing minimum which is dependent on the relation between the calories brought to the plate 2 and those taken from the plate 3.

A molten layer is thus formed, which is bonded by the material itself to a layer of superposed non-molten fibers, the thickness ratio between the layers being dependent on the heat ratio between the plates.

The process according to the invention is remarkable in that the progressive melting of the fibers of the felt 7 evolves according to a vertically increasing front with respect to an ever present superposed fibrous layer. As a result, any gaseous release can follow the aerated structure of that layer allowing, through the peripheral opening of the mold, a permanent and efficient degassing. A molten layer is thus obtained which is completely free of any gaseous trappings and which shows, as a result, physical and mechanical properties never heretofore obtained.

The process can proceed without stress or without risk of the molten layer leaking or spreading out of the open mold, since the very low pressure exerted by plate 3 is so selected as to prevent the material from flowing as it melts. To arrive at such a result, it is also possible to place inside the mold a fibrous layer or felt 7 which juts out of the peripheral edges of plates 2 and 3.

When the fibrous material has melted over the required thickness, plate 2 is cooled down in order to gel and harden the molten layer and to obtain a compact skin 1 having a smooth surface 1a on its face in contact with plate 2. Cooling is achieved by maintaining the pressure exerted by plate 3.

The mold can then be opened for removing the obtained material.

Because of the low pressure exerted by plate 3, the fluffy layer 1b is really constituted by the fibers of the felt, said fibers being in their initial condition, seeing that they have suffered no permanent deformation stresses, especially at the level of their base joining up with the skin 1. Thus said fibers, which are not molten, but which, nevertheless are an integral part of the skin, preserve the fluffy appearance which they had conferred to the felt, a physical characteristic never heretofore obtained.

The resulting new product is therefore a new material which can be called a laminate if the skin 1 and the layer $1_1$ are called strata.

Said new product may be used for different purposes as is, to form platings, coatings or other facings of an ornamental, protecting or comfortable nature, depending on whether the accessible face is smooth face 1a or the fluffy face 1b. Said material may be used for decoration, packing, or as a single or composite industrial material.

Said material can also be transformed by thermoshaping, since the skin only needs to be heated in order to soften up and take on the required shape.

Figure 3:
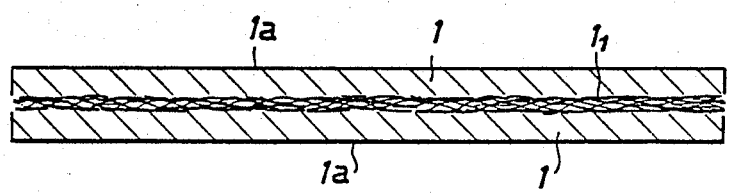
FIGS. 3 and 4 are elevational cross-sections illustrating two variant embodiments of the material.

One development of the invention is illustrated in FIG. 3, according to which the plates 2 and 3 are heated alternately or simultaneously to produce a material with two skins 1, having opposite smooth surfaces which are closely bonded together by a fluffy layer $1_1$ corresponding to a thickness of non-melted felt fibers. It is obviously possible, by varying the supply and drawing of calories to and from plates 2 and 3, to obtain thicknesses of skins 1 and of layer $1_1$ which are either identical or variable, depending on the subsequent application of the material.

Figure 4:
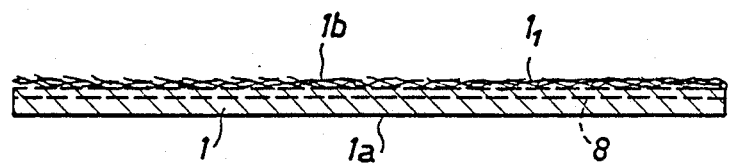

FIG. 4 illustrates another development consisting in producing a material which contains an inner reinforcing structure 8 of non-thermomeltable fibers. In this case, the procedure is as follows.

First a textile reinforcing structure is produced in glass, carbon, aromatic polyamide ..., in any appropriate form, such as fabrics, unidirectional layers, or bi- or tri-dimensional layers, in which the yarns or fibers are coated with a meltable material, if they are not actually made of such material which is, moreover compatible with that constituting the felt 7. According to the process of the invention, said textile reinforcing structure is sandwiched between two felts 7 containing thermoplastic fibers or yarns.

Then, a first felt 7 is deposited on plate 2, said felt being covered over with a reinforcing structure 8 on which is deposited a second felt 7, generally of the same material as the first felt. This is the simplest way of carrying out the method according to the invention, bearing in mind that other combinations of felts and reinforcing textile structures can also be used, as long as the two outer layers of the stack in contact with the plates are constituted of felts based on thermomeltable fibers.

Felt 7, which is in contact with heating plate 2, is completely melted by the heat treatment. The same also applies to the meltable material associated to the reinforcing textile structure 8 as well as to part of the thickness of the second felt close to its zone of contact with said structure 8. The finished product can be brought out after cooling of plate 2 and lifting up of upper plate 3. Said finished product is in the form of a sheet of resin, smooth on one side and of feltlike appearance on the other, the reinforcing structure 8 being enclosed. In other words, the obtained product is in the form of strata, closely bonded together through melting of the thermoplastic resin of the felt 7, of the reinforcing structure 8 and of part of the second felt 7, without however, there being any interpenetration between the strata, this being due to the fact that, in the process according to the invention, a very low pressure is exerted throughout the treatment and also that the periphery of the stack is free, thus allowing degassing of the fibrous structures.

Compared with prior processes for producing laminated structures, the process according to the invention presents many advantages which may be explained by the fact that, according to the invention, the resin is packed beforehand in felt form and that it is then possible to obtain a distribution of the material inside the mold which is at least as uniform as with the prior techniques. It is moreover easier to obtain a structure of non-developable shape, since a felt can readily adopt such a shape whereas a film has to be shaped beforehand.

Moreover, the process according to the invention enables definite elimination of any air trapped between the materials and the mold. Also, owing to the choice of a resin in felt form, in such melting conditions, the weakly compressed felt remains sufficiently elastic for the non-molten fibers to keep in contact with the mold, whereas the fluid resin which penetrates between the non-melted fibers of the felt convey the energy that it has picked up. As a result, the already fluid resin is maintained in lateral displacement by non-melted fibers. Thermal progression is much faster than in a static resin.

Finally, to produce a laminate comprising several layers of reinforcing fibers, it suffices, according to the invention, to insert, between each layer, a light felt of the same nature as the outer felts, this facilitating cross-linking between the layers, without interpenetration of the resin between said layers or strata. The presence of such felts further permits a total evacuation of any air trapped in the layers.

It is of course possible to implement the development illustrated in FIG. 4, in combination with the production of a material such as illustrated in FIG. 3.

Figure 5:
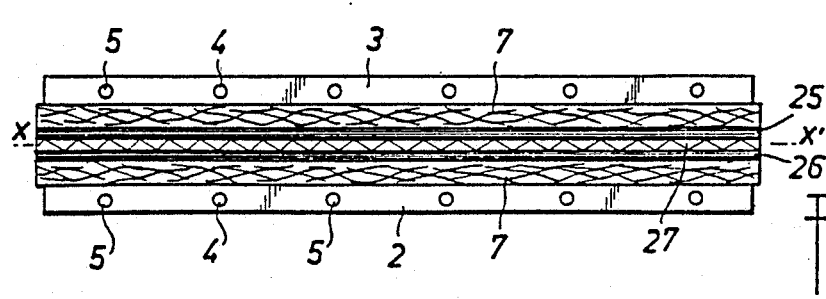
FIG. 5 is an elevational cross-section giving a detailed illustration of one embodiment shown in FIG. 4.

FIG. 5 illustrates another development of the invention in which a reinforced laminated material of the type illustrated in FIG. 4 is produced, said material having further improved mechanical properties or strength. As described hereinabove, two felts 7 are interposed between plates 2 and 3, between which felts are placed three superposed layers of reinforcing fibrous structures 25, 26 and 27.

Figure 6:
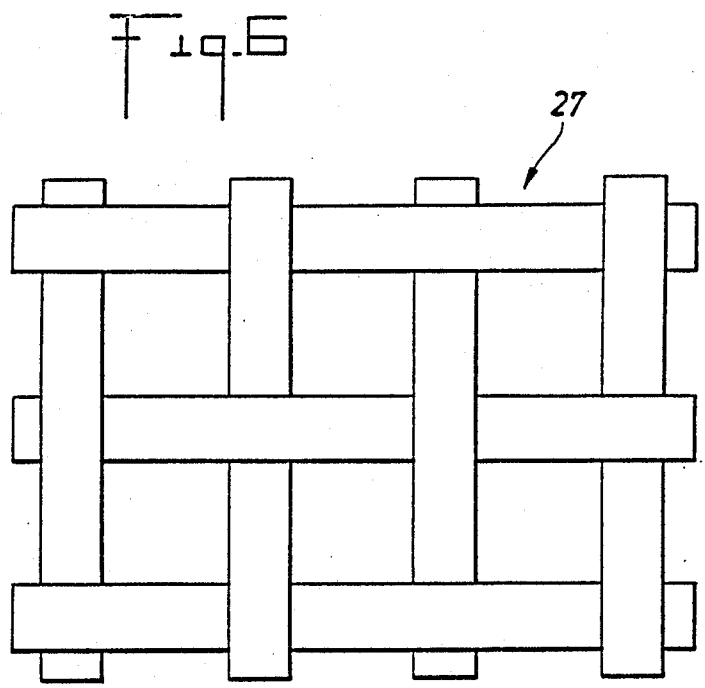
FIG. 6 is a plan view showing, on an enlarged scale, one constituting element of the material shown in FIG. 5.

According to this embodiment, the layer 27, placed inside the plane of symmetry, is constituted of a material composed of meltable monostrand yarns, such as illustrated in FIG. 6. Said material is constituted of spaced out warp and weft yarns, and ensures, after a treatment according to the invention, cross-linking between the reinforcements 25, 26 proper.

Figure 7:
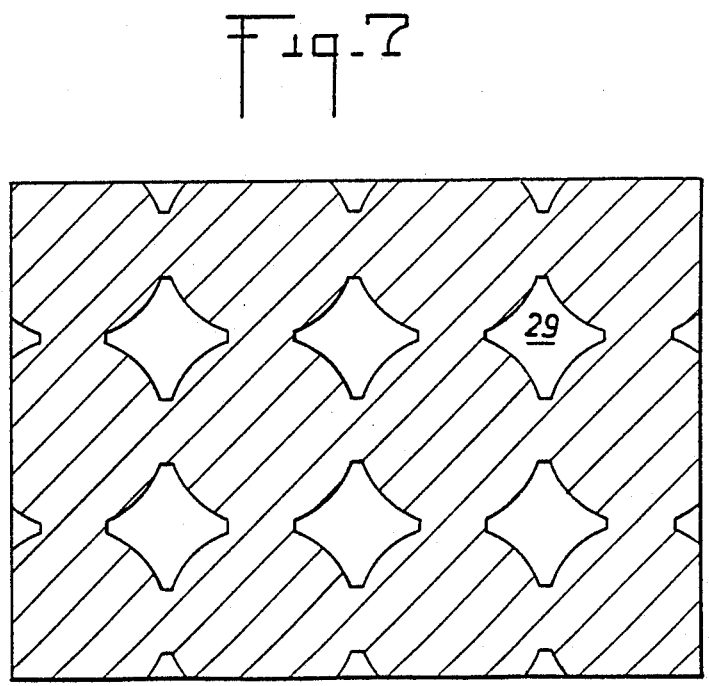

In this particular embodiment, through the entire duration of the melting of the felts 7, the cross-linking material permits the degassing through its section. FIG. 7 illustrates a cross-section, along a principal plane, such as x—x' of FIG. 5, of a laminated structure produced according to said process. It is clear from said FIG. 7 that, during the melting phase, the thickness of the material was brought down to a slightly smaller thickness than that of the yarn constituting it. Because of the excess thickness due to the bracing, there is obviously an uneven melting and spreading of the material constituting the yarns, leaving out occluded chambers 29 forming a kind of meshed structure between the two opposite strata constituted by the skins 1, and even by the layer $1_1$ and reinforcing structures 8.

The presence of such an intermediate structure, situated in the neutral zone, confers to the laminated complex, properties never heretofore obtained. Indeed, the excess thickness thus created permits a comparison between said structure and the honeycomb-type structure. The thickness is less, but the linking is improved.

Figure 8:
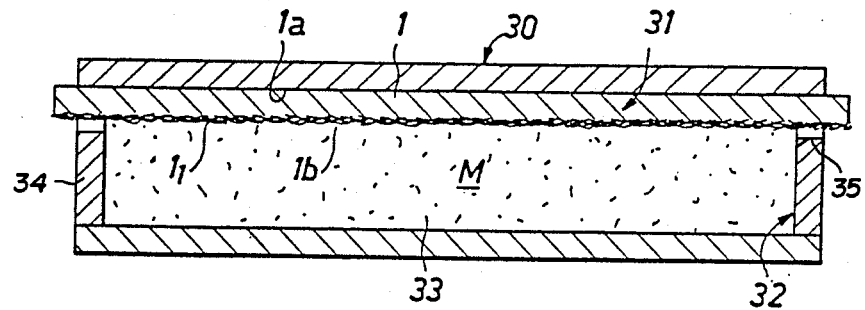
FIGS. 8 and 9 are elevational cross-sections of two other variant embodiments of the material.

FIG. 8 shows another possible variant of the invention, in which a laminated composite is produced by placing inside a mold 30, a sheet 31 of new material, such as of the type illustrated in FIG. 1. Said sheet 31 is arranged so as to be applied on the bottom of the mold 30 by the smooth face $1a$ of the skin 1. The fluffy face $1b$ is then oriented towards the free volume 32 of the mold which, of course, is only shown diagrammatically to illustrate a confining volume. A foam M is then expanded in said mold 30 so as to fill the free space 32, according to a known process, specific to the selected raw material and known to anyone skilled in the art. Said foam M, which may be polyurethane for example, thus forms a layer 33 filling the whole space 32 which confines it and forms it, the density of said foam being selected as a function of the destination of the laminated composite material. The layer 33 of foam M is closely bonded to the sheet 31 by the fluffy layer $1_1$ which forms a close-bonding and progressive transition layer, eliminating any risk of subsequent delamination. In the foam-expanding phase, the mold is oriented so that the skin 1 is in high position to facilitate degassing through the fluffy layer $1_1$. To this effect, it is recommended to use a mold having a removable surround or frame 34 to allow the positioning of a sheet 31 projecting peripherally as shown in $31_1$. This allows degassing through the fluffy layer $1_1$.

Figure 9:
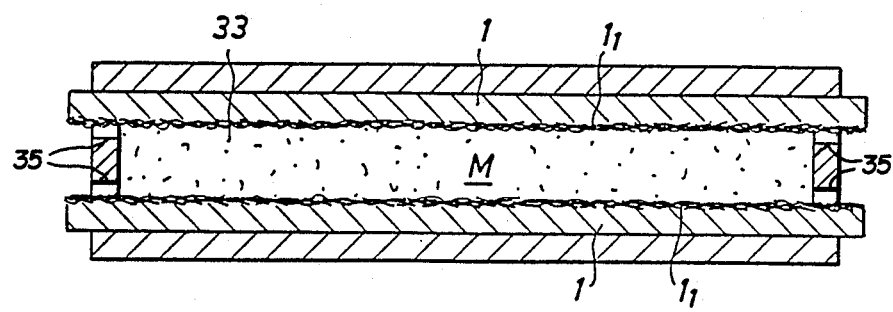

FIG. 9 illustrates a variant of the preceding method according to which a new laminated composite material is produced by laying in the mold 30, two sheets 31 in facing relation by their fluffy faces $1b$, which define between them a free space 32 for receiving a layer 33 of foam M. The resulting material is a laminated composite composed of two panels, formed by the skins 1, bonded together by a core of foam M.

It is obvious that in the foregoing examples, the sheets 31 could also be of the type illustrated in FIG. 4.

In both cases, the molds 30 which are used, are preferably provided with perforations or openings 35 situated inside the plane of layer or layer $1_1$, so as allow therethrough the degassing of the expansion phase of foam M.

In the laminated composite materials obtained according to the process of FIGS. 8 and 9, the foam M is overdensified inside the layer $1_1$ which it has penetrated. Each fibrous layer $1_1$ thus constitutes a progressive transition between two materials of very different comportment, which are the resin skin 1 and the expanded foam layer 33.

The layer $1_1$ of non-melted felt has several important functions, which are:

that it allows the evacuation of the air progressively expelled from the fibrous complex during the melting phase, that it helps to expel the air contained inside the space 32 through the expanded foam.

Indeed, up to this day, said air was expelled through a vent system. The section of the vents is always a compromise between the necessity not to create counter-pressures opposing the expansion of the foam and the necessity to prevent the foam, at the end of the expanding phase, from escaping in too large quantities. The normal practice has consisted in producing vents of small diameter and increasing the weight of the foam by at least 30%, so that said foam develops enough pressure to expel any air stopped before passing through the vents. This way, the expansion of the foam is slowed down, which interferes with its isotropy, and at the end of the expanding phase, the foam exerts a strong and unnecessary pressure which must be contained by reinforcing the structure of the mold.

With the invention, on the contrary, it is possible to mold the foam M at a very low pressure, without any risk of said foam running out of the mold. Indeed, the layer or layers $1_1$, being open on the periphery, constitute a passage for the air which is scores of times superior to that provided by any adequately dimensioned vents. Consequently, the foam M, being overdensified by lamination inside the layer or layers $1_1$, creates, itself, the plug which prevents it from running out.

Moreover, reaction molding is normally accompanied by the formation of air pockets which are permanently confined in the foam inside the cavity to be filled. This risk is all the greater that the shape of the cavity is complex.

The fibrous part of each skin 1 eliminates this risk. Indeed, it is dense enough to prevent it from being completely penetrated before the foam has filled the whole of space 32. The penetration the foam inside the layer $1_1$ is therefore progressive and regular over the entire surface. The air has thus the possibility of escaping until the time of the final filling of space 32.

Furthermore, the bonding plane between the foam M and skins 1 is normally a privileged breaking point. This results in the foam splitting or detaching itself. The lack of adhesiveness is mainly due to the nature of the materials which have little or no chemical affinity. The production method may be incriminated when the foam contacts with the skin while in a state of too advanced polymerization. Heretofore, the necessity of providing a progressive transition between the skins 1 and the foam M has led manufacturers to bond fibers or a sheet of glass on the inside face of the skin or skins. But such an operation is expensive and lengthy. To be efficient, the bonding layer must be thick. Also, the polyurethane foam, which is very sensitive to solvent vapors cannot be expanded before the adhesive has stopped releasing any vapors. Even after several days, the foam, when coming into contact with the adhesive, suffers a phenomenon of over-expansion which is bad for the bonding.

The material according to the invention eliminates this drawback, due to the fact that the fibrous layer $1_1$ of the structure is bonded to the skin by melting, this preventing any of the aforesaid risks and problems.

Also, the foam which has penetrated into the layer $1_1$ has a mean density four or five times greater than that of the core. Over-densification is due to the splitting of the cells when these are cut through by a fiber. Only the first cells lose gas, this explaining why overdensification is proportional to the thickness of the traversed felt. When using a needled felt, its surface bonding strength in the foam and on the surface of the skin is sufficient for it to constitute, when only partly impregnated, a bond which improves the sound insulation of the structure. Experiments have shown that while the felt is not entirely impregnated, the molding pressure remains low. This reservation therefore allows a greater tolerance as regards the weight of the foam to be injected. This is very appreciated when the temperature of the different constituents of the structure is difficult to control.

POSSIBLE INDUSTRIAL APPLICATIONS

The invention can be applied to many fields. The new material can be used as a covering of insulating or decorative nature for walls, partitions or industrial domestic manufactured or decorative objects or as a raw material for the production of complex laminates.

What is claimed is:

1. A process for producing a thermoplastic laminated material from a thermoplastic resin which comprises placing at least one felt comprising thermoplastic resin fibers in a mold having two opposing faces at least one of which is a heating face, said mold being open at its periphery when in operation, heating at least one of the faces of the mold to the melting temperature of the thermoplastic resin fibers, while exerting a slight pressure on the felt, to melt the fibers of the felt through part of the thickness of the felt; cooling the mold while maintaining a low pressure; and opening the mold to remove the thermoplastic laminated material.

2. A process as claimed in claim 1, which includes preparing the felt from thermoplastic resin fibers.

3. A process as claimed in claim 2, wherein the melting of the thermoplastic resin fibers occurs progressively in a vertical front to permit release of gas through the open periphery of the mold.

4. A process as claimed in claim 2, wherein the exerted pressure on the felt is between 50 and 300 kgp/m$^2$.

5. A process as claimed in claim 2, wherein one of the faces of the mold is heated while the opposite face of the mold is cooled.

6. A process as claimed in claim 2, wherein both faces of the mold are simultaneously heated.

7. A process as claimed in claim 2 which comprises placing a reinforcing structure inside the mold between two felts.

8. A process as claimed in claim 7, wherein a reinforcing structure comprising several layers is placed inside the mold, one of the reinforcing layers comprising a criss-crossing of monostrand yarns of thermo-meltable materials.

9. A process for producing a foamed thermoplastic laminated material which comprises placing in a mold a thermoplastic resin laminate layer having at least one dense compact layer free from trapped gases and integral therewith, a fibrous layer formed of thermoplastic resin fibers; and wherein the mold has two opposing faces which define an open space therebetween when the mold is closed, at least one face of the mold is a heating face, and wherein the fibrous layer of the thermoplastic laminate faces the free space inside the mold, which mold is provided with apertures situated in the plane of said layer when the mold is closed; placing a foam forming material in the free space of the mold and expanding said foam forming material, when the mold is closed and contains the laminate, to fill the free space of the mold and to bind with the fibrous layer of the laminate to form a foamed thermoplastic laminate.

10. A thermoplastic resin laminate having at least one dense compact layer free from trapped gases and integral therewith, a fibrous layer formed of thermoplastic resin fibers.

11. A thermoplastic laminate as claimed in claim 10 containing a reinforcing structure in the dense layer.

12. A thermoplastic laminate as claimed in claim 10 containing two dense compact layers free from trapped gases and integrel therewith a fibrous layer which binds the two compact layers together.

13. A thermoplastic laminate as claimed in claim 11, wherein the reinforcing structure is obtained from a meshing which confers a honeycomb-like structure in the reinforcing area.

14. A foamed thermoplastic laminated material comprising a thermoplastic resin laminate layer having at least one dense compact layer free from trapped gases and integral therewith, a fibrous layer formed of thermoplastic resin fibers and a foam layer, wherein the fibrous layer forms a transition layer between the foam and the compact layer and the mean density of the foam in the fibrous layer is greater than the mean density of the foam in the foamed layer.

15. A foamed thermoplastic laminated material as claimed in claim 14, comprising two dense compact layers with the foam layer sandwiched therebetween and in contact with the fibrous layers integral with the dense compact layers.

16. A foamed thermoplastic laminated material as claimed in claim 14, wherein the foam is a polyurethane foam.

17. The product produced by the process of claim 1.

18. The product produced by the process of claim 9.

* * * * *